(12) United States Patent
Liu et al.

(10) Patent No.: US 12,126,844 B2
(45) Date of Patent: Oct. 22, 2024

(54) METHODS, APPARATUSES, READABLE MEDIA AND ELECTRONIC DEVICES FOR LIVE STREAM INTERACTION

(71) Applicant: Beijing Youzhuju Network Technology Co., Ltd., Beijing (CN)

(72) Inventors: Ji Liu, Beijing (CN); Yu Sun, Beijing (CN); Weijia Kong, Beijing (CN); Jinming Zhang, Beijing (CN); Lei Jin, Beijing (CN); Ling Yang, Beijing (CN); Xue Yao, Beijing (CN); Sijing Wang, Beijing (CN); Jinhui Guo, Beijing (CN); Bing Zhou, Beijing (CN); Siqi Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/400,019

(22) Filed: Dec. 29, 2023

(65) Prior Publication Data

US 2024/0137581 A1 Apr. 25, 2024
US 2024/0236382 A9 Jul. 11, 2024

Related U.S. Application Data

(63) Continuation of application No. PCT/CN2022/121531, filed on Sep. 27, 2022.

(30) Foreign Application Priority Data

Sep. 30, 2021 (CN) .......................... 202111165716.3

(51) Int. Cl.
*H04N 21/218* (2011.01)
*G06F 9/451* (2018.01)
(Continued)

(52) U.S. Cl.
CPC ......... *H04N 21/2187* (2013.01); *G06F 9/451* (2018.02); *G06V 40/23* (2022.01);
(Continued)

(58) Field of Classification Search
CPC ........... H04N 21/2187; H04N 21/4302; H04N 21/4307; H04N 21/43074; H04N 21/431; G06T 7/70; G06F 9/451
(Continued)

(56) References Cited

U.S. PATENT DOCUMENTS 5,818,441 A * 10/1998 Throckmorton ... H04N 21/4782
725/138
11,086,644 B1 * 8/2021 Balaram ............. G06F 9/45512
(Continued)

FOREIGN PATENT DOCUMENTS

CN 108391157 A 8/2018
CN 109874021 A 6/2019
(Continued)

OTHER PUBLICATIONS

International Search Report (with English translation) and Written Opinion issued in PCT/CN2022/121531, dated Jan. 4, 2023, 9 pages provided.
(Continued)

*Primary Examiner* — Dominic D Saltarelli
(74) *Attorney, Agent, or Firm* — HSML P.C.

(57) ABSTRACT

The disclosure relates to a method, apparatus, readable medium, and electronic device for live stream interaction. The method includes: in accordance with displaying of a first control at a first target position of a live stream interface, obtaining a first duration during which a user watches the live stream interface; in accordance with a determination that the first duration is greater than or equal to a first predetermined duration threshold, switching the first control
(Continued)

to a second control, and displaying the second control at a second target position of the live stream interface; and in response to a first operation command performed by the user on the second control, allocating a virtual resource to the user. In this way, interaction modes of a live stream room are enriched, and an activity level of the live stream room can be improved.

20 Claims, 5 Drawing Sheets

(51) Int. Cl.
  *G06V 40/20* (2022.01)
  *H04N 21/2187* (2011.01)
  *H04N 21/43* (2011.01)
  *H04N 21/431* (2011.01)
(52) U.S. Cl.
  CPC ... *H04N 21/4302* (2013.01); *H04N 21/43074* (2020.08); *H04N 21/431* (2013.01)
(58) Field of Classification Search
  USPC .......................................................... 725/62
  See application file for complete search history.

(56) References Cited

U.S. PATENT DOCUMENTS

| | | | | |
|---|---|---|---|---|
| 11,146,847 | B1* | 10/2021 | Harshawat | H04M 1/72406 |
| 11,792,483 | B2* | 10/2023 | Ganschow | G06F 3/0482 |
| | | | | 725/37 |
| 2010/0077423 | A1 | 3/2010 | Yonishi et al. | |
| 2012/0272256 | A1 | 10/2012 | Bedi | |
| 2018/0255360 | A1 | 9/2018 | Li | |
| 2019/0387267 | A1* | 12/2019 | Shusman | H04N 21/2668 |
| 2020/0110520 | A1* | 4/2020 | Barlow | G06N 20/00 |
| 2021/0266631 | A1 | 8/2021 | Geng | |
| 2021/0397846 | A1* | 12/2021 | Chang | A63F 13/828 |
| 2022/0312075 | A1* | 9/2022 | Dhiman | G06V 20/41 |

FOREIGN PATENT DOCUMENTS

| | | |
|---|---|---|
| CN | 110599263 A | 12/2019 |
| CN | 111405343 A | 7/2020 |
| CN | 111757135 A | 10/2020 |
| CN | 112188299 A | 1/2021 |
| CN | 112218103 A | 1/2021 |
| CN | 112672175 A | 4/2021 |
| CN | 112933596 A | 6/2021 |
| CN | 113286204 A | 8/2021 |
| CN | 113301361 A | 8/2021 |
| CN | 113345054 A | 9/2021 |
| CN | 113395533 A | 9/2021 |
| CN | 113423017 A | 9/2021 |
| CN | 113873314 A | 12/2021 |
| WO | 2021047430 A1 | 3/2021 |

OTHER PUBLICATIONS

Office Action issued in corresponding Chinese Application No. 202111165716.3, dated Jul. 10, 2023, with English machine translation.
Extended European Search Report issued in European Patent Application No. 22874868.7, Jul. 5, 2024 (8 pages).
Office Action issued in Chinese Patent Application No. 202111165716.3, Jun. 28, 2024, with machine translation (16 pages).

* cited by examiner

METHODS, APPARATUSES, READABLE MEDIA AND ELECTRONIC DEVICES FOR LIVE STREAM INTERACTION

CROSS REFERENCE

The present application is a continuation of International Patent Application No. PCT/CN2022/121531, filed on Sep. 27, 2022, which claims the benefit of Chinese Patent Application No. 202111165716.3 filed on Sep. 30, 2021, both of which are incorporated herein by reference in their entirely.

FIELD

The present disclosure relates to the field of Internet technologies, specifically to a method, apparatus, readable medium and electronic device for live stream interaction.

BACKGROUND

With the popularity of terminal devices such as mobile phones and tablets and the continuous development of Internet technologies, real-time video communications such as network live stream is becoming more and more popular. In related technologies, the display of an interface of a live stream room is monotonous, and interaction between an audience and a live streamer in the live stream room is relatively unvarying when watching a live stream.

SUMMARY

This summary is provided to briefly introduce concepts, which will be described in detail in the following detailed description. This summary is not intended to identify key features or essential features of the claimed technical solutions, nor is it intended to limit the scope of the claimed technical solutions.

In a first aspect, the present disclosure provides a method for live stream interaction, which comprises: in accordance with displaying of a first control at a first target position of a live stream interface, obtaining a first duration during which a user watches the live stream interface; in accordance with a determination that the first duration is greater than or equal to a first predetermined duration threshold, switching the first control to a second control, and displaying the second control at a second target position of the live stream interface; and in response to a first operation command performed by the user on the second control, allocating a virtual resource to the user.

In a second aspect, the present disclosure provides an apparatus for live stream interaction, which comprises:
- a first duration obtaining module configured to, in accordance with displaying of a first control at a first target position of the live stream interface, obtain a first duration during which a user watches the live stream interface;
- a control switching module configured to, in accordance with a determination that the first duration is greater than or equal to a first predetermined duration threshold, switch the first control to a second control, and display the second control at a second target position of the live stream interface; and
- an interaction module configured to, in response to a first operation command performed by the user on the second control, allocate a virtual resource to the user.

In a third aspect, the present disclosure provides a non-transitory computer-readable medium having a computer program stored thereon, that when executed by a processing device, implements the steps of the method described in the first aspect of the present disclosure.

In a fourth aspect, the present disclosure provides an electronic device comprising:
- a storage device having a computer program stored thereon; and
- a processing device that is configured to execute the computer program in the storage device to implement the steps of the method described in the first aspect of the present disclosure.

By employing the above technical solution, in accordance with displaying of a first control at a first target position of a live stream interface, a first duration during which a user watches the live stream interface is obtained; in accordance with a determination that the first duration is greater than or equal to a first predetermined duration threshold, the first control is switched to a second control, and the second control is displayed at a second target position of the live stream interface; and in response to a first operation command performed by the user on the second control, a virtual resource is allocated to the user. As such, interaction modes of a live stream room are enriched, and an activity level of the live stream room can be improved by setting the first predetermined duration threshold for switching from the first control to the second control, and allocating the virtual resource to the user in response to the operation performed by the user on the second control, which can enhance user experience.

Other features and advantages of the present disclosure will be described in detail in the following detailed description.

BRIEF DESCRIPTION OF DRAWINGS

The above and other features, advantages, and aspects of the various embodiments of the present disclosure will become more apparent in conjunction with the accompanying drawings and with reference to the following detailed description. Throughout the accompanying drawings, identical or similar reference numbers indicate identical or similar elements. It should be understood that the accompanying drawings are illustrative and that components and elements are not necessarily drawn to scale. In the accompanying drawings.

DETAILED DESCRIPTION

Figure 1:
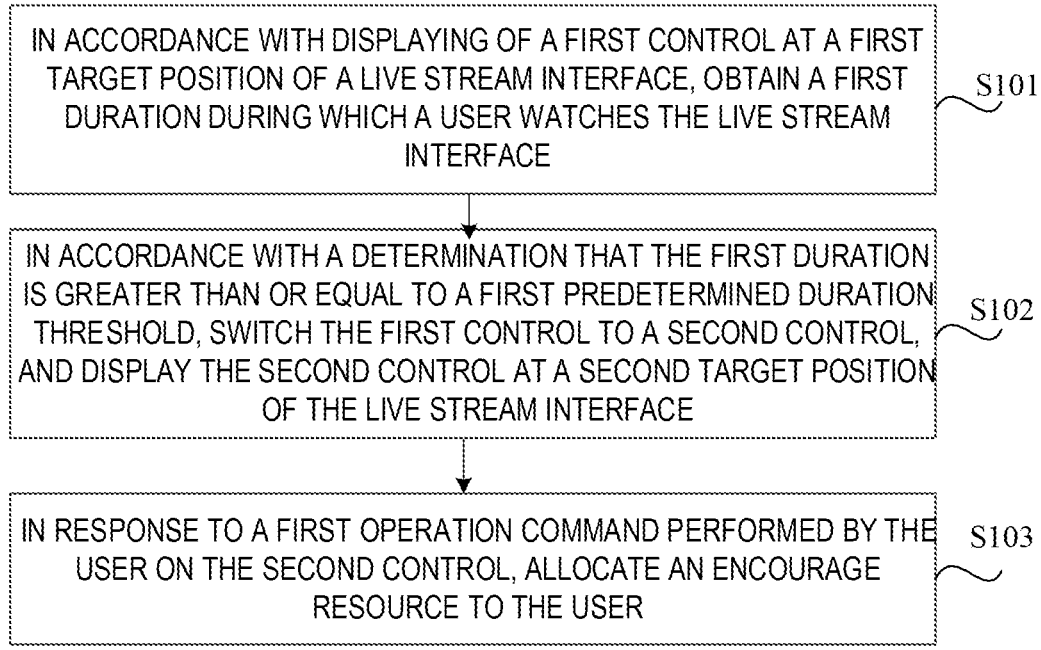
FIG. 1 is a flowchart illustrates a live stream interaction method according to an example embodiment.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the accompanying drawings and embodiments of the present disclosure are for illustrative purposes only and are not intended to limit the scope of the present disclosure.

It should be understood that various steps described in method implementations of the present disclosure can be executed in different orders and/or in parallel. In addition, the method implementations can include additional steps and/or omit the steps shown. The scope of the present disclosure is not limited in this regard.

The term "including" and its variations as used herein are openly inclusive, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in the present disclosure are only used to distinguish different apparatuses, modules, or units, and are not used to limit the order or interdependence of the functions performed by these apparatuses, modules, or units.

It should be noted that the modifications of "one" and "a plurality of" mentioned in the present disclosure are illustrative and not restrictive. Those skilled in the art should understand that unless otherwise specified in the context, they should be understood as "one or more".

The names of the messages or information exchanged between a plurality of devices in this public implementation are for illustrative purposes only and are not intended to limit the scope of these messages or information.

Firstly, the application scenarios disclosed herein will be explained. The present disclosure can be applied to live stream interaction scenarios. In the related technologies, interaction modes that an audience can perform with a live streamer in a live stream room while watching a live stream in the live stream room can include following, gifting, liking, sending text, etc. These interaction modes are relatively monotonous, resulting in a low activity level and poor user experience in the live stream room.

In order to solve the above problems, the present disclosure provides a method, apparatus, readable medium and electronic device for live stream interaction, by switching between a first control and a second control in a live stream interface, and allocating a virtual resource to a user in response to an operation performed by the user on the second control, which can realize rich interaction modes, improve the activity level in the live stream room, and enhance the user experience.

The following detailed description in conjunction with the accompanying drawings of the present disclosure will be described in detail.

FIG. 1 illustrates a method for live stream interaction according to an example embodiment, as shown in FIG. 1, which includes:

Step 101: in accordance with displaying of a first control at a first target position of a live stream interface, obtaining a first duration during which a user watches the live stream interface;

Step 102: in accordance with a determination that the first duration is greater than or equal to a first predetermined duration threshold, switching the first control to a second control, and displaying the second control at a second target position of the live stream interface; and Step 103: in response to a first operation command performed by the user on the second control, a virtual resource is allocated to the user.

By way of example, the above mentioned first predetermined duration threshold can be any predetermined duration, which can be 5 minutes, 10 minutes, or 30 minutes. By setting the first predetermined duration threshold, users can be attracted to focus on a live stream interface for watching. The first operation command can be a click command or a double-click instruction, and the above mentioned virtual resources can be points, lottery tickets, or prizes.

Furthermore, the shape of the first control can be in the form of a predetermined cartoon, such as the form of a predetermined character, the form of a predetermined animal, the form of a predetermined plant, or the form of a predetermined item. The second control and the first control can be in different forms or have different sizes. For example, the first control is in the form of a predetermined animal, and the second control is in the form of a predetermined item; or the first control and the second control are both in the form of a same predetermined plant, but the area of the second control is larger than that of the first control.

The first target position can be located on a side of the head of a live streamer in the live stream interface and the second target position can be the same as the first target position or different from the first target position.

Figure 2A:
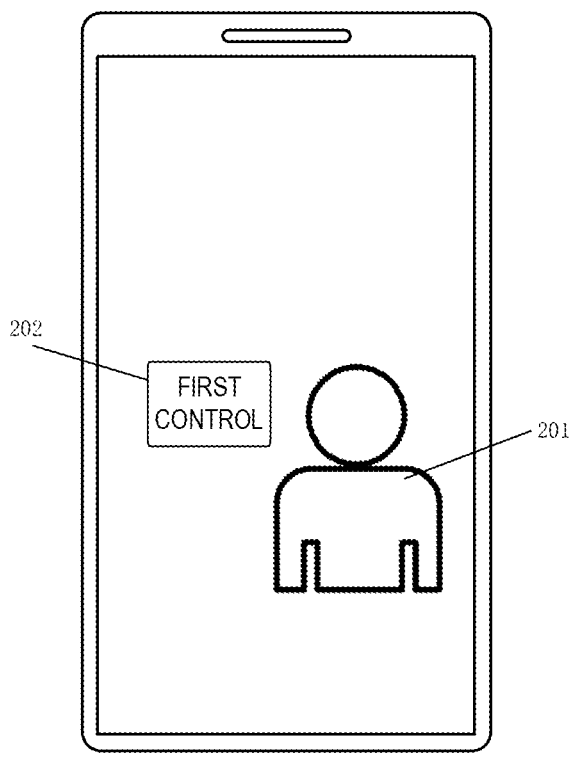
FIG. 2a is a schematic diagram illustrates displaying of a first control at a first target position of a live stream interface according to an example embodiment.
Figure 2B:
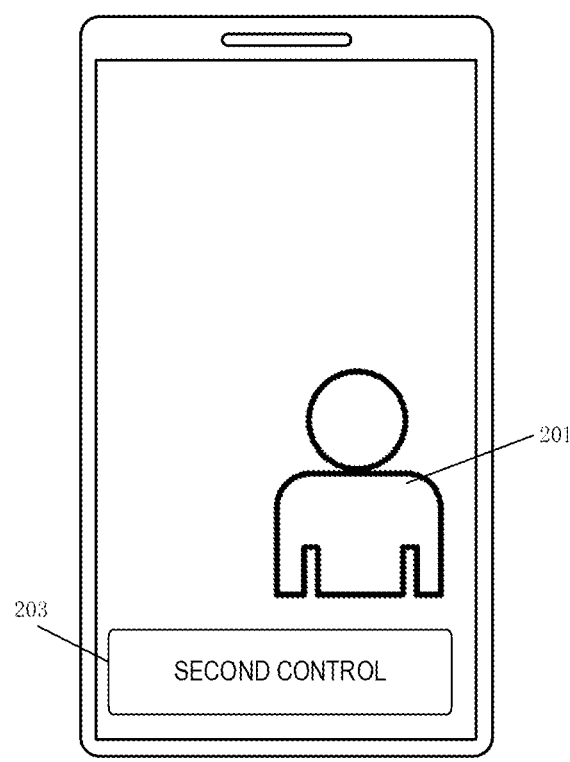
FIG. 2b is a schematic diagram illustrates displaying of a second control at a second target position of the live stream interface according to an example embodiment.

As an example, FIG. 2a illustrates a schematic diagram of displaying of a first control at a first target position of a live stream interface according to an example embodiment. As shown in FIG. 2a, a live streamer image 201 in the live stream interface can be displayed at the lower right side of the live stream interface. The first target position of the first control 202 can be located on a side of the head of a live streamer and the first control 202 can be in the form of a young money tree. FIG. 2b illustrates a schematic diagram of displaying of a second control at a second target position of the live stream interface according to an example embodiment. As shown in FIG. 2b, the live streamer image 201 in the live stream interface can still be displayed at the lower right side of the live stream interface. The second target position of the second control 203 can be below the head of the live streamer and the second control 203 can be in the form of a grown money tree.

By using the above method, in accordance with displaying of a first control at a first target position of a live stream interface, a first duration during which a user watches the live stream interface is obtained. In accordance with a determination that the first duration is greater than or equal to a first predetermined duration threshold, the first control is switched to a second control, and the second control is displayed at a second target position of the live stream interface. In response to a first operation command performed by the user on the second control, a virtual resource is allocated to the user. As such, interaction modes of a live stream room are enriched, an activity level of the live stream room can be improved by setting the first predetermined duration threshold for switching from the first control to the second control, and allocating the virtual resource to the user in response to the operation performed by the user on the second control, which can enhance user experience.

Figure 3:
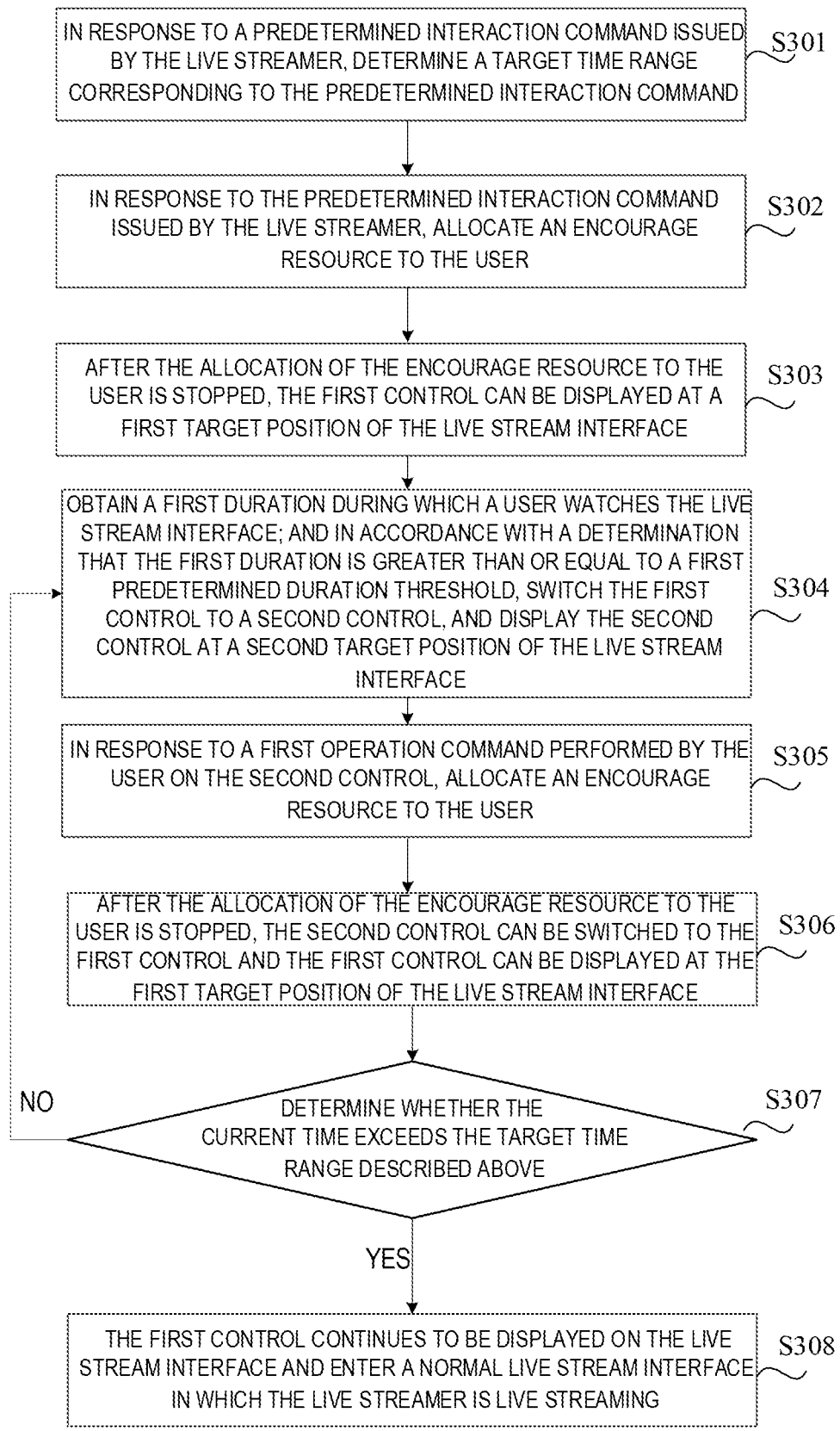
FIG. 3 is a flowchart illustrates another method for live stream interaction according to an example embodiment.

In another embodiment of the present disclosure, in order to avoid the impact of live stream interaction on a normal live stream of the live streamer, a live stream interaction activity can be controlled by the live streamer and started according to a predetermined interaction command of the live stream. FIG. 3 illustrates another method for live stream interaction according to an example embodiment, as shown in FIG. 3. The method includes:

Step 301: in response to a predetermined interaction command issued by the live streamer, determining a target time range corresponding to the predetermined interaction command.

A current time when the predetermined interaction command is received herein can be used as an interaction start time, and the time at a predetermined duration after the current time can be used as an interaction end time. The time range between the interaction start time and the interaction end time can be used as the target time range. The predetermined duration herein can be a predetermined time for the predetermined interaction instruction, such as 10 minutes, 30 minutes, or 60 minutes.

For example, if the current time when the predetermined interaction command is received is 16:21:00 on Sep. 1, 2021, and the predetermined duration corresponding to the predetermined interaction command is 30 minutes, the interaction start time is 16:21:00 on Sep. 1, 2021, and the interaction end time is 16:51:00 on Sep. 1, 2021. Therefore, the target time range is from 16:21:00 on Sep. 1, 2021 to 16:51:00 on Sep. 1, 2021.

It should be noted that since time of a live stream server side and time of live stream clients in the live stream may be inconsistent, the above-mentioned target time range can be determined by the live stream server side, that is, after the predetermined interaction instruction is received, the live stream server side determines the interaction start time and the interaction end time based on the current time of the server side. Then an interaction start command is send to respective live stream client immediately, which includes the interaction start time and the interaction end time. The live stream client determine a real interaction end time of the live stream client by determining the difference between the current time of the live stream client and the interaction start time, avoiding the difference in the target time range caused by the time difference of different clients.

Step 302: in response to the predetermined interaction command issued by the live streamer, allocating a virtual resource to the user.

In this step, the virtual resource can be directly allocated to the user, or the virtual resource can be allocated to the user through a predetermined interaction mode.

Allocating the virtual resource to the user through the predetermined interaction mode herein may include the following steps:

First, display a predetermined target interface;

Secondly, receiving, via the predetermined target interface, a second operation command sent by the user through a client; and Finally, allocating the virtual resource to the user based on a performance result of the second operation command.

By way of example, the predetermined target interface may include a shake interaction interface, which can display the shake interaction interface to the user and allocate N lottery opportunities to the user, where N is a predetermined positive integer greater than 0, for example, N equals to 3. When the shake interaction interface is displayed, a gyroscope of a terminal can be utilized for lottery. The gyroscope is an angular motion detection device made of a high-speed rotating body's momentum-sensitive shell relative to the inertial space around one or two axes orthogonal to the rotation axis, and the angular motion detection device that uses other principles to perform the same function is also called a gyroscope. When the user shakes the terminal, the gyroscope (angular motion detection device) of the terminal will be triggered. When the gyroscope detects that the terminal has rotated to a certain angle, one lottery of the terminal can be recognized, thereby shaking out a virtual resource. The virtual resource is given to the user, and the number of the user's lottery opportunities is subtracted by one. If the number of the user's lottery opportunities is reduced to 0, or if the duration of the allocation of virtual resource is greater than or equal to a predetermined encourage duration, the allocation of virtual resource to the user is stopped.

In another example, the predetermined target interface may include a red packet interface. For example, the predetermined target interface may include a single red packet, and the virtual resource can be randomly allocated to the user once the user clicks on the red packet. Another example is that the predetermined target interface may include a plurality of red packets, which move from top to bottom to form a red packet rain. When the user clicks on a certain red packet, the virtual resource can be randomly allocated to the user.

Furthermore, the red packets can be of a target shape(s). The target shapes can be set based on the item being live streamed or can also be a red packet or lucky bag shape with a target brand logo. Alternatively, the target shapes can be customized by a target enterprise. For example, based on a plurality of items to be live streamed, the target shape corresponding to respective item can be predetermined. If item A is being live streamed when the user enters the predetermined target interface, the shape of the red packets can be a target shape corresponding to the item A.

Step S303: after the allocation of the virtual resource to the user is stopped, the first control can be displayed at a first target position of the live stream interface.

The way to display the first control can include:

First, obtaining position information of a predetermined part of a live streamer in the live stream interface; and Then, determining the first target position, and displaying the first control at the first target position based on the position information.

For example, the predetermined part can be the head of the live streamer, and a side of the head of the live streamer can be used as the first target position. The first control can be in the above-mentioned form of the young money tree. That is, the above-mentioned form of the young money tree is displayed on a side (left or right) of the head of the live streamer.

Further, in accordance with a determination that the live streamer is performing a body movement in the live stream interface, the first control may be controlled to move to follow the predetermined part of the live streamer.

In this way, the viewability of the first control can be improved and the user experience can be enhanced, which thereby can draw the user's attention to the live stream room.

Step S304: obtaining a first duration during which a user watches the live stream interface; and in accordance with a determination that the first duration is greater than or equal to a first predetermined duration threshold, switching the first control to a second control, and displaying the second control at a second target position of the live stream interface.

Furthermore, in accordance with a determination that the first duration is greater than or equal to the first predetermined duration threshold, whether a current time is within a target time range can be determined, the target time range being determined based on a time that a predetermined interaction command is received from a live streamer. For example, the target time range may include a time range between the interaction start time and the interaction end time.

In accordance with a determination that the current time is within the target time range, the first control is switched to the second control, and the second control is displayed at the second target position.

Conversely, in accordance with a determination that the current time has exceeded the target time range, the first control continues to be displayed and no further steps will be performed.

As such, a time to join an interaction activity through the second control can be controlled by a predetermined interaction command of the live streamer, which can provide rich interaction modes based on the command of the live streamer and avoid the impact of the interaction activity on a normal live stream activity of the live streamer.

Step S305: in response to a first operation command performed by the user on the second control, allocating a virtual resource to the user.

Similarly, in this step, a first batch of virtual resources can be directly allocated to user, or the virtual resources can be allocated to the user through a predetermined interaction mode. The allocation of the virtual resources to the user through the predetermined interaction mode herein can also include the following steps: displaying a predetermined target interface; receiving, via the predetermined target interface, a second operation command sent by the user through a client;

and allocating the virtual resources to the user based on a performance result of the second operation command. The specific implementation steps can be described in step S302 and will not be repeated here.

Step S306, after the allocation of the virtual resource to the user is stopped, the second control can be switched to the first control and the first control can be displayed at the first target position of the live stream interface.

In this way, the user can be prompted that the virtual resource has been allocated and the first control can continue to be displayed.

Step S307: determining whether the current time exceeds the target time range described above. In accordance with a determination that the current time is within the target time range, the process of steps S304, S305, and S306 is performed in a loop until the current time exceeds the target time range.

Step S308: after the current time exceeds the target time range, that is, after the current time exceeds the interaction end time, the first control can continue to be displayed on the live stream interface and a normal live stream interface in which the live streamer is live streaming is entered.

By adopting the above method, the user can be interacted with through the first control and the second control based on the predetermined interaction command issued by the live streamer, which improves the user experience in the live stream room.

In another embodiment of the present disclosure, in accordance with displaying of a first control at a first target position of a live stream interface, a third operation command performed by a user on the first control can be received. In response to receiving the third operation command performed by the user on the first control, a first target action is determined from a plurality of predetermined actions corresponding to the first control and the first control is controlled to perform the first target action.

The first target action herein includes a control swing action or an action for displaying predetermined information, wherein the control swing action can include the first control swinging from side to side and the action for displaying predetermined information can include displaying predetermined target information through the first control, which can be a plurality of predetermined target information, such as a plurality of predetermined target text information, a plurality of predetermined target image information, or a plurality of predetermined target voice information. The predetermined target information can also be a combination of text and voice; or a combination of image and voice.

For example, when receiving the third operation command, the control swing action or the action for displaying predetermined information described above can be randomly performed, and the displayed predetermined target information can also be randomly selected from the plurality of predetermined target information described above for display.

In another example, M predetermined target information to be displayed can be predetermined. Each time the third operation command is received, the control swing action, displaying of a first predetermined target information, displaying of a second predetermined target information, . . . , displaying of a M-th predetermined target information can be performed in sequence based on the cumulative number of times the third operation command is received, and then performed in the above order in a loop.

For example, counting starts from displaying the first control. If the third operation command is received for the first time, the control swing action is performed; if the third operation command is received for the second time, the first predetermined target information is displayed; if the third operation command is received for the third time, the second predetermined target information is displayed; . . . ; if the third operation command is received for the (M+1)-th time, the M-th predetermined target information is displayed; if the third operation command is received for the (M+2)-th time, the control swing action is performed; if the third operation command is received for the (M+3)-th time, the first predetermined target information is displayed; and so on.

For example, the third operation command may include a click command and a double-click command, and different operation commands may correspond to different target actions. For example, the click command may correspond to the control swing action, and the double-click command may correspond to the action for displaying the predetermined information.

In addition, in accordance with a determination that the third operation command has not been received, performing a second target action periodically.

The second target action can be the same as or different from the first target action. For example, the second target action can also include the control swing action or the action for displaying the predetermined information.

In this way, the user can also be interacted with through the first control, which enriches interaction behavior in the live stream room and improves the user experience.

In another embodiment of the present disclosure, the shape of the first control described above can be a predetermined shape, which can be a control including a target brand logo or a shape customized by a target enterprise.

In this way, the target brand or the target enterprise can be promoted through the first control.

In summary, by employing the above method, in accordance with displaying of a first control at a first target position of a live stream interface, a first duration during which a user watches the live stream interface is obtained; in accordance with a determination that the first duration is greater than or equal to a first predetermined duration threshold, the first control is switched to a second control, and the second control is displayed at a second target position of the live stream interface; and in response to a first operation command performed by the user on the second control, a virtual resource is allocated to the user. As such, interaction modes of a live stream room are enriched, and an activity level of the live stream room can be improved by setting the first predetermined duration threshold for switching from the first control to the second control, and allocating the virtual resource to the user in response to the operation performed by the user on the second control, which can enhance user experience.

Figure 4:
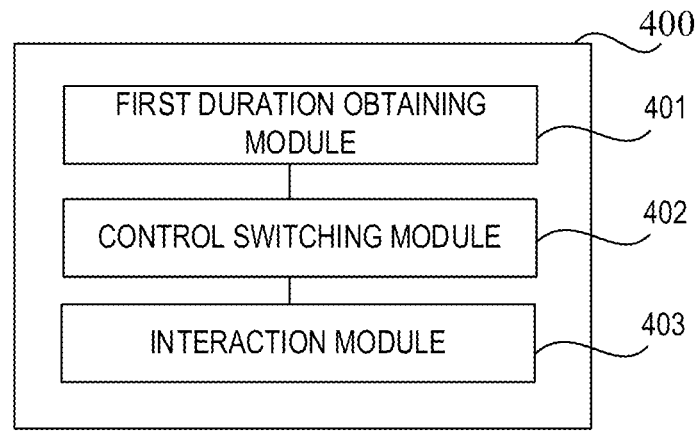
FIG. 4 is a block diagram illustrates an apparatus for live stream interaction according to an example embodiment.

FIG. 4 is a block diagram illustrates an apparatus for live stream interaction according to an example embodiment, as shown in FIG. 4, the apparatus comprising: a first duration obtaining module 401 configured to, in accordance with displaying of a first control at a first target position of the live stream interface, obtain a first duration during which a user watches the live stream interface; a control switching module 402 configured to, in accordance with a determination that the first duration is greater than or equal to a first predetermined duration threshold, switch the first control to a second control, and display the second control at a second target position of the live stream interface; and an interaction module 403 configured to, in response to a first operation command performed by the user on the second control, allocate a virtual resource to the user.

Optionally, the interaction module 403 is configured to: in response to the first operation command performed by the user on the second control, display a predetermined target interface; receive, via the predetermined target interface, a second operation command sent by the user through a client; and allocate the virtual resource to the user based on a performance result of the second operation command.

Optionally, the control switching module 402 is configured to: in accordance with a determination that the first duration is greater than or equal to the first predetermined duration threshold, determine whether a current time is within a target time range, the target time range being determined based on a time that a predetermined interaction command is received from a live streamer; and in accordance with a determination that the current time is within the target time range, switch the first control to the second control, and display the second control at the second target position.

Figure 5:
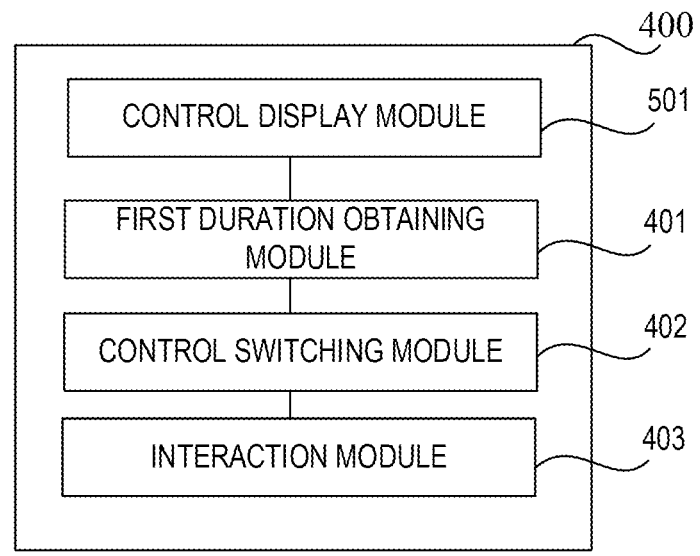
FIG. 5 is a block diagram illustrates another apparatus for live stream interaction according to an example embodiment.

FIG. 5 is a block diagram illustrates another apparatus for live stream interaction according to an example embodiment, as shown in FIG. 5, the apparatus further includes: a control display module 501 configured to obtain position information of a predetermined part of a live streamer in the live stream interface; and determine the first target position and display the first control at the first target position based on the position information.

Optionally, the control display module 501 is also configured to in accordance with a determination that the live streamer is performing a body movement in the live stream interface, control the first control to move to follow the predetermined part of the live streamer.

Figure 6:
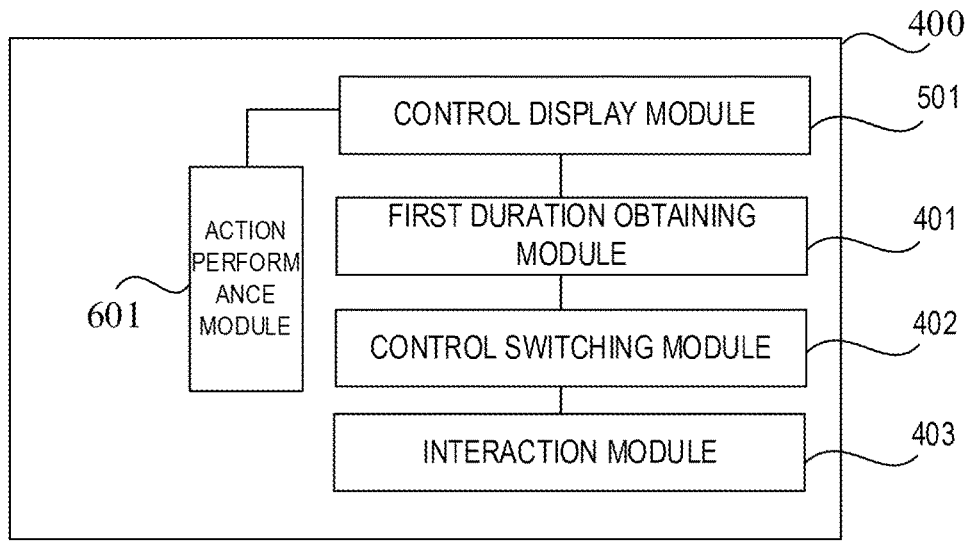
FIG. 6 is a block diagram illustrates a further apparatus for live stream interaction according to an example embodiment.

FIG. 6 is a block diagram illustrates a further apparatus for live stream interaction according to an example embodiment. As shown in FIG. 6, the apparatus further includes: an action performance module 601 configured to in response to receiving a third operation command performed by the user on the first control, determine a first target action from a plurality of predetermined actions corresponding to the first control; and control the first control to perform the first target action.

Optionally, the action performance module 601 is also configured to in accordance with a determination that the third operation command has not been received, perform a second target action periodically.

In summary, by employing the above apparatus, in accordance with displaying of a first control at a first target position of a live stream interface, a first duration during which a user watches the live stream interface is obtained; in accordance with a determination that the first duration is greater than or equal to a first predetermined duration threshold, the first control is switched to a second control, and the second control is displayed at a second target position of the live stream interface; and in response to a first operation command performed by the user on the second control, a virtual resource is allocated to the user. As such, interaction modes of a live stream room are enriched, and an activity level of the live stream room can be improved by setting the first predetermined duration threshold for switching from the first control to the second control, and allocating the virtual resource to the user in response to the operation performed by the user on the second control, which can enhance user experience.

Figure 7:
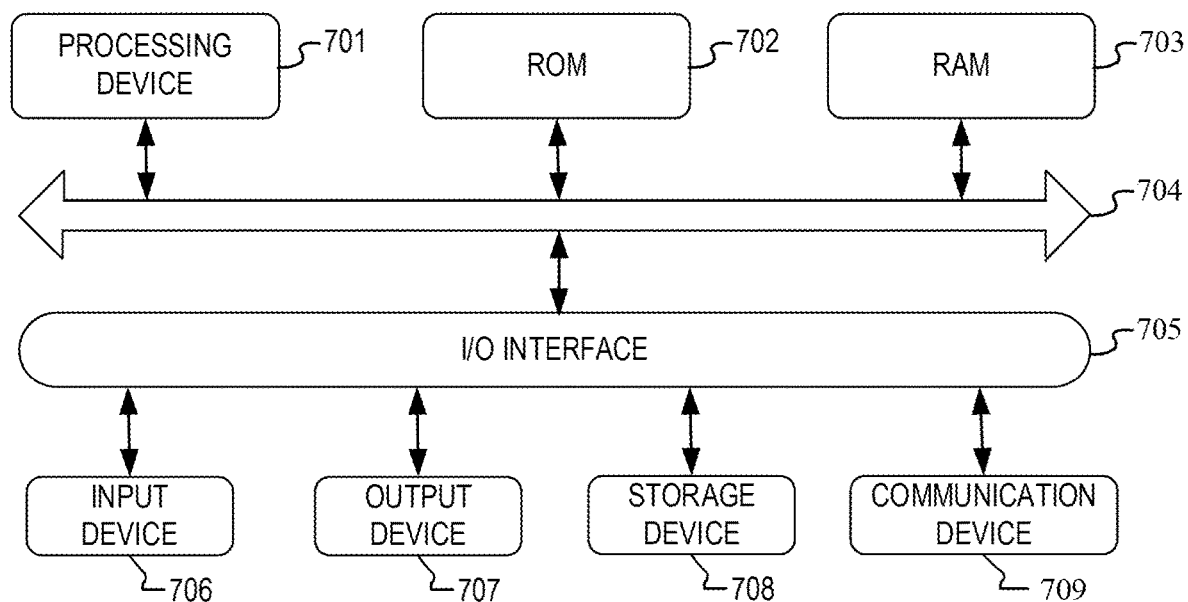
FIG. 7 is a block diagram illustrates an electronic device according to an example embodiment.

Referring now to FIG. 7, which illustrates a schematic diagram of a structure of an electronic device 700 suitable for implementing an embodiment of the disclosure, terminal devices in an embodiment of the present disclosure may include, but are not limited to, mobile terminals such as mobile phones, notebook computers, digital broadcast receivers, PDAs (personal digital assistants), PADs (tablets), PMPs (portable multimedia players), vehicle terminals (such as vehicle navigation terminals), and fixed terminals such as digital TVs, desktop computers, etc. The electronic device shown in FIG. 7 is merely an example and should not bring any limitation on the functionality and scope of use of the embodiment of the present disclosure.

As shown in FIG. 7, electronic device 700 may include processing devices 701 (such as central processor, graphics processing unit, etc.), which can perform various appropriate actions and processes based on programs stored in read-only memory (ROM) 702 or loaded from storage device 708 into random access memory (RAM) 703. In RAM 703, various programs and data required for the operation of electronic device 700 are also stored. Processing devices 701, ROM 702, and RAM 703 are connected to each other through bus 704. Input/output (I/O) interface 705 is also connected to bus 704.

Typically, the following devices can be connected to the I/O interface 705: input devices 706, including touch screens, touchpads, keyboards, mice, cameras, microphones, accelerometers, gyroscopes, etc.; output devices 707, including liquid crystal displays (LCDs), speakers, vibrators, etc.; storage devices 708, including magnetic tapes, hard disks, etc.; and communication devices 709. Communication devices 709 can allow electronic devices 700 to communicate wirelessly or wirelessly with other devices to exchange data. Although FIG. 7 shows electronic devices 700 with various devices, it should be understood that it is not required to implement or have all of the devices shown. More or fewer devices can be implemented or provided instead.

In particular, according to embodiments of the present disclosure, the process described above with reference to the flowchart can be implemented as a computer software program. For example, embodiments of the present disclosure include a computer program product that includes a computer program carried on a non-transitory computer-readable medium, the computer program containing program code for performing the method shown in the flowchart. In such embodiments, the computer program can be downloaded and installed from the network through the communication device 709, or installed from the storage device 708, or installed from the ROM 702. When the computer program is executed by the processing device 701, the above functions defined in the method of the present disclosure embodiment are performed.

It should be noted that the computer-readable medium described above in the present disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In the present disclosure, a computer-readable storage medium can be any tangible medium containing or storing a program that can be used by or in conjunction with an instruction execution system, apparatus, or device. In the present disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, apparatuses, or devices. The program code contained on the computer-readable medium can be transmitted using any suitable medium, including but not limited to: wires, optical cables, RF (radio frequency), etc., or any suitable combination thereof.

In some embodiments, the client and server may communicate using any currently known or future developed network protocol such as HTTP (HyperText Transfer Protocol), and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone without being assembled into the electronic device.

The above computer-readable medium carries one or more programs, and the one or more programs when executed by the electronic device, cause the electronic device to: in accordance with displaying of a first control at a first target position of a live stream interface, obtain a first duration during which a user watches the live stream interface; in accordance with a determination that the first duration is greater than or equal to a first predetermined duration threshold, switch the first control to a second control, and display the second control at a second target position of the live stream interface; and in response to a first operation command performed by the user on the second control, allocate a virtual resource to the user.

Computer program code for performing the operations of the present disclosure may be written in one or more programming languages, or combinations thereof, including but not limited to Object Oriented programming languages such as Java, Smalltalk, C++, and also including conventional procedural programming languages such as "C" language or similar programming languages. The program code may be executed entirely on the user's computer, partially on the user's computer, as a standalone software package, partially on the user's computer, or entirely on the remote computer or server. In the case of a remote computer, the remote computer may be connected to the user's computer through any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of the system, method, and computer program product that may be implemented in accordance with various embodiments of the present disclosure. In this regard, each block in the flowcharts or block diagrams may represent a module, program segment, or portion of code that contains one or more executable instructions for implementing a specified logical function. It should also be noted that in some alternative implementations, the functions marked in the blocks may also occur in a different order than those marked in the drawings. For example, two consecutive blocks may actually be executed substantially in parallel, and they may sometimes be executed in the opposite order, depending on the function involved. It should also be noted that each block in the block diagrams and/or flowcharts, as well as combinations of blocks in the block diagrams and/or flowcharts, may be implemented using a dedicated hardware-based system that performs the specified function or operation, or may be implemented using a combination of dedicated hardware and computer instructions.

The modules described in the disclosed embodiments can be implemented by software or hardware. The name of the module does not constitute a limitation on the module itself in some cases. For example, a first duration obtaining module can also be described as "a module that obtains a first duration during which a user watches the live stream interface in accordance with displaying of a first control at a first target position of the live stream interface".

The functions described above herein may be performed at least in part by one or more hardware logic components. For example, without limitation, example types of hardware logic components that may be used include field programmable gate arrays (FPGAs), application specific integrated circuits (ASICs), application specific standard products (ASSPs), system-on-chip (SOCs), complex programmable logic devices (CPLDs), and the like.

In the context of the present disclosure, machine-readable media can be tangible media that can contain or store programs for use by or in conjunction with instruction execution systems, apparatuses, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, Example 1 provides a method for live stream interaction, the method comprising: in accordance with displaying of a first control at a first target position of a live stream interface, obtaining a first duration during which a user watches the live stream interface; in accordance with a determination that the first duration is greater than or equal to a first predetermined duration threshold, switching the first control to a second control, and displaying the second control at a second target position of the live stream interface; and in response to a first operation command performed by the user on the second control, allocating a virtual resource to the user.

According to one or more embodiments of the present disclosure, Example 2 provides the method of Example 1, wherein in response to a target operation command performed by the user on the second control, the allocating a virtual resource to the user comprises: in response to the first operation command performed by the user on the second control, displaying a predetermined target interface; receiving, via the predetermined target interface, a second operation command sent by the user through a client; and allocating the virtual resource to the user based on a performance result of the second operation command.

According to one or more embodiments of the present disclosure, Example 3 provides the method of Example 1, wherein in accordance with a determination that the first duration is greater than or equal to a first predetermined duration threshold, the switching the first control to a second control and displaying the second control at a second target position of the live stream interface comprises: in accordance with a determination that the first duration is greater than or equal to the first predetermined duration threshold, determining whether a current time is within a target time range, the target time range being determined based on a time that a predetermined interaction command is received from a live streamer; and in accordance with a determination that the current time is within the target time range, switching the first control to the second control, and displaying the second control at the second target position.

According to one or more embodiments of the present disclosure, Example 4 provides the method of Example 1, wherein the displaying of the first control at a first target position of a live stream interface comprises: obtaining position information of a predetermined part of a live streamer in the live stream interface; and determining the first target position and displaying the first control at the first target position based on the position information.

According to one or more embodiments of the present disclosure, Example 5 provides the method of Example 4, which further comprises: in accordance with a determination that the live streamer is performing a body movement in the live stream interface, controlling the first control to move to follow the predetermined part of the live streamer.

According to one or more embodiments of the present disclosure, Example 6 provides a method of any of Examples 1 to 5, which further comprises: in response to receiving a third operation command performed by the user on the first control, determining a first target action from a plurality of predetermined actions corresponding to the first control; and controlling the first control to perform the first target action.

According to one or more embodiments of the present disclosure, Example 7 provides the method of Example 6, which further comprises: in accordance with a determination that the third operation command has not been received, performing a second target action periodically.

According to one or more embodiments of the present disclosure, Example 8 provides an apparatus for live stream interaction, which comprises: a first duration obtaining module configured to, in accordance with displaying of a first control at a first target position of the live stream interface, obtain a first duration during which a user watches the live stream interface; a control switching module configured to, in accordance with a determination that the first duration is greater than or equal to a first predetermined duration threshold, switch the first control to a second control, and display the second control at a second target position of the live stream interface; and an interaction module configured to, in response to a first operation command performed by the user on the second control, allocate a virtual resource to the user.

According to one or more embodiments of the present disclosure, Example 9 provides a non-transitory computer-readable medium having a computer program stored thereon, the program, when executed by a processing device, implements the steps of the method described in any of Examples 1 to 7.

According to one or more embodiments of the present disclosure, Example 10 provides an electronic device comprising: a storage device having a computer program stored thereon; and a processing device for executing the computer program in the storage device to implement the steps of the method described in any of Examples 1 to 7.

The above description is only the best embodiment of the present disclosure and an explanation of the technical principles used. Those skilled in the art should understand that the scope of the disclosure involved in the present disclosure is not limited to technical solutions composed of specific combinations of the above technical features, but should also cover other technical solutions formed by arbitrary combinations of the above technical features or their equivalent features without departing from the above disclosure concept. For example, technical solutions formed by replacing the above features with (but not limited to) technical features with similar functions disclosed in the present disclosure.

In addition, although various operations are depicted in a specific order, this should not be understood as requiring these operations to be performed in the specific order shown or in a sequential order. In certain environments, multitasking and parallel processing may be advantageous. Similarly, although several specific implementation details are included in the above discussion, these should not be construed as limiting the scope of the present disclosure. Certain features described in the context of individual embodiments can also be implemented in combination in a single embodiment. Conversely, various features described in the context of a single embodiment can also be implemented separately or in any suitable sub-combination in a plurality of embodiments.

Although the subject matter has been described in language specific to structural features and/or method logic actions, it should be understood that the subject matter defined in the appended claims is not necessarily limited to the specific features or actions described above. On the contrary, the specific features and actions described above are only example forms of implementing the claims. Regarding the device in the above embodiments, the specific ways in which each module performs operations have been described in detail in the embodiments related to the method, and will not be described in detail here.

We claim:

1. A method for live stream interaction, comprising
in accordance with displaying of a first control at a first target position of a live stream interface, obtaining a first duration during which a user watches the live stream interface;
in accordance with a determination that the first duration is greater than or equal to a first predetermined duration threshold, switching the first control to a second control, and displaying the second control at a second target position of the live stream interface, wherein the second control and the first control have different characters or have different sizes, the second control and the first control have predetermined characters; and
in response to a first operation command performed by the user on the second control, allocating a virtual resource to the user.

2. The method of claim 1, wherein in response to a target operation command performed by the user on the second control, the allocating a virtual resource to the user comprises:
in response to the first operation command performed by the user on the second control, displaying a predetermined target interface;
receiving, via the predetermined target interface, a second operation command sent by the user through a client; and
allocating the virtual resource to the user based on a performance result of the second operation command.

3. The method of claim 1, wherein in accordance with a determination that the first duration is greater than or equal to a first predetermined duration threshold, the switching the first control to a second control and displaying the second control at a second target position of the live stream interface comprises:
in accordance with a determination that the first duration is greater than or equal to the first predetermined duration threshold, determining whether a current time is within a target time range, the target time range being determined based on a time that a predetermined interaction command is received from a live streamer; and
in accordance with a determination that the current time is within the target time range, switching the first control to the second control, and displaying the second control at the second target position.

4. The method of claim 1, wherein the displaying of the first control at a first target position of a live stream interface comprises:
obtaining position information of a predetermined part of a live streamer in the live stream interface; and
determining the first target position and displaying the first control at the first target position based on the position information.

5. The method of claim 4, wherein the method further comprises:
in accordance with a determination that the live streamer is performing a body movement in the live stream interface, controlling the first control to move to follow the predetermined part of the live streamer.

6. The method of claim 1, wherein the method further comprises:
in response to receiving a third operation command performed by the user on the first control, determining a first target action from a plurality of predetermined actions corresponding to the first control; and
controlling the first control to perform the first target action.

7. The method of claim 6, wherein the method further comprises:
in accordance with a determination that the third operation command has not been received, performing a second target action periodically.

8. A non-transitory computer-readable medium having a computer program stored thereon, the program, when executed by a processing device, cause the processing device to perform acts comprising:
in accordance with displaying of a first control at a first target position of a live stream interface, obtaining a first duration during which a user watches the live stream interface, wherein the second control and the first control have different characters or have different sizes, the second control and the first control have predetermined characters;
in accordance with a determination that the first duration is greater than or equal to a first predetermined duration threshold, switching the first control to a second control, and displaying the second control at a second target position of the live stream interface; and
in response to a first operation command performed by the user on the second control, allocating a virtual resource to the user.

9. The non-transitory computer-readable medium of claim 8, wherein in response to a target operation command performed by the user on the second control, the allocating a virtual resource to the user comprises:
in response to the first operation command performed by the user on the second control, displaying a predetermined target interface;
receiving, via the predetermined target interface, a second operation command sent by the user through a client; and
allocating the virtual resource to the user based on a performance result of the second operation command.

10. The non-transitory computer-readable medium of claim 8, wherein in accordance with a determination that the first duration is greater than or equal to a first predetermined duration threshold, the switching the first control to a second control and displaying the second control at a second target position of the live stream interface comprises:
in accordance with a determination that the first duration is greater than or equal to the first predetermined duration threshold, determining whether a current time is within a target time range, the target time range being determined based on a time that a predetermined interaction command is received from a live streamer; and
in accordance with a determination that the current time is within the target time range, switching the first control to the second control, and displaying the second control at the second target position.

11. The non-transitory computer-readable medium of claim 8, wherein the displaying of the first control at a first target position of a live stream interface comprises:
    obtaining position information of a predetermined part of a live streamer in the live stream interface; and
    determining the first target position and displaying the first control at the first target position based on the position information.

12. The non-transitory computer-readable medium of claim 11, wherein the acts further comprise:
    in accordance with a determination that the live streamer is performing a body movement in the live stream interface, controlling the first control to move to follow the predetermined part of the live streamer.

13. The non-transitory computer-readable medium of claim 8, wherein the acts further comprise:
    in response to receiving a third operation command performed by the user on the first control, determining a first target action from a plurality of predetermined actions corresponding to the first control; and
    controlling the first control to perform the first target action.

14. The non-transitory computer-readable medium of claim 13, wherein the acts further comprise:
    in accordance with a determination that the third operation command has not been received, performing a second target action periodically.

15. An electronic device, comprising:
    a storage device having a computer program stored thereon; and
    a processing device that is configured to execute the computer program in the storage device to perform acts comprising:
        in accordance with displaying of a first control at a first target position of a live stream interface, obtaining a first duration during which a user watches the live stream interface, wherein the second control and the first control have different characters or have different sizes, the second control and the first control have predetermined characters;
        in accordance with a determination that the first duration is greater than or equal to a first predetermined duration threshold, switching the first control to a second control, and displaying the second control at a second target position of the live stream interface; and
        in response to a first operation command performed by the user on the second control, allocating a virtual resource to the user.

16. The electronic device of claim 15, wherein in response to a target operation command performed by the user on the second control, the allocating a virtual resource to the user comprises:
    in response to the first operation command performed by the user on the second control, displaying a predetermined target interface;
    receiving, via the predetermined target interface, a second operation command sent by the user through a client; and
    allocating the virtual resource to the user based on a performance result of the second operation command.

17. The electronic device of claim 15, wherein in accordance with a determination that the first duration is greater than or equal to a first predetermined duration threshold, the switching the first control to a second control and displaying the second control at a second target position of the live stream interface comprises:
    in accordance with a determination that the first duration is greater than or equal to the first predetermined duration threshold, determining whether a current time is within a target time range, the target time range being determined based on a time that a predetermined interaction command is received from a live streamer; and
    in accordance with a determination that the current time is within the target time range, switching the first control to the second control, and displaying the second control at the second target position.

18. The electronic device of claim 15, wherein the displaying of the first control at a first target position of a live stream interface comprises:
    obtaining position information of a predetermined part of a live streamer in the live stream interface; and
    determining the first target position and displaying the first control at the first target position based on the position information.

19. The electronic device of claim 18, wherein the acts further comprise:
    in accordance with a determination that the live streamer is performing a body movement in the live stream interface, controlling the first control to move to follow the predetermined part of the live streamer.

20. The electronic device of claim 15, wherein the acts further comprise:
    in response to receiving a third operation command performed by the user on the first control, determining a first target action from a plurality of predetermined actions corresponding to the first control; and
    controlling the first control to perform the first target action.

* * * * *